United States Patent
Mannheim Astete et al.

(10) Patent No.: US 12,128,650 B2
(45) Date of Patent: Oct. 29, 2024

(54) HYBRID ASYMMETRIC AUTOMOTIVE LAMINATE

(71) Applicant: AGP America S.A., Ciudad de Panama (PA)

(72) Inventors: Mario Arturo Mannheim Astete, Lima (DE); Iván Cornejo, Lima (DE); Osmar Curi, Lima (DE); Jurgen De Schepper, Lima (DE)

(73) Assignee: AGP America S.A., Panama (PA)

( * ) Notice: Subject to any disclaimer, the term of this patent is extended or adjusted under 35 U.S.C. 154(b) by 0 days.

(21) Appl. No.: 17/779,225

(22) PCT Filed: Nov. 27, 2020

(86) PCT No.: PCT/IB2020/061245
§ 371 (c)(1),
(2) Date: May 24, 2022

(87) PCT Pub. No.: WO2021/105958
PCT Pub. Date: Jun. 3, 2021

(65) Prior Publication Data
US 2022/0402243 A1 Dec. 22, 2022

Related U.S. Application Data

(60) Provisional application No. 62/942,015, filed on Nov. 29, 2019.

(51) Int. Cl.
*B32B 17/10* (2006.01)
*B32B 3/06* (2006.01)
(Continued)

(52) U.S. Cl.
CPC .......... *B32B 17/10036* (2013.01); *B32B 3/06* (2013.01); *B32B 3/08* (2013.01);
(Continued)

(58) Field of Classification Search
CPC ....... B32B 17/10036; B32B 3/06; B32B 3/08; B32B 3/266; B32B 7/022;
(Continued)

(56) References Cited

FOREIGN PATENT DOCUMENTS

WO    WO-2018178882 A1 * 10/2018    ....... B32B 17/10036

* cited by examiner

*Primary Examiner* — Catherine A. Simone
(74) *Attorney, Agent, or Firm* — The Morales Law Firm; Joseph L. Morales

(57) ABSTRACT

Laminated automotive glazing, once limited to just the windshield, is finding more and more application in other positions in vehicles due to its ability to reduce weight, as well as to improve passenger safety, security and comfort. Designing a laminate that can serve as a direct replacement for tempered glass can be challenging Tempered glass is 4 to 5 times stronger than annealed glass and the lamination process has limitations that are not present with tempered. In particular, it is difficult to produce thin laminated glazing with holes. The laminate of the invention comprises strengthened thin glass layers in combination with laminated inserts to provide a thin laminated glazing with holes that has all of the advantages inherent in a laminate while retaining the reliability and utility of a tempered part and further can serve as a direct replacement for a tempered part.

23 Claims, 14 Drawing Sheets

(51) Int. Cl.
    *B32B 3/08*           (2006.01)
    *B32B 3/26*           (2006.01)
    *B32B 7/022*         (2019.01)

(52) U.S. Cl.
    CPC .............. *B32B 3/266* (2013.01); *B32B 7/022* (2019.01); *B32B 17/10091* (2013.01); *B32B 17/10155* (2013.01); *B32B 2250/03* (2013.01); *B32B 2307/536* (2013.01); *B32B 2307/54* (2013.01); *B32B 2307/546* (2013.01); *B32B 2307/732* (2013.01); *B32B 2605/006* (2013.01)

(58) Field of Classification Search
    CPC ........ B32B 17/10091; B32B 17/10155; B32B 2250/03; B32B 2307/536; B32B 2307/54; B32B 2307/546; B32B 2307/732; B32B 2605/006; B60J 1/006; B60J 1/008; B60J 1/17; B60J 5/04
    See application file for complete search history.

HYBRID ASYMMETRIC AUTOMOTIVE LAMINATE

FIELD OF THE INVENTION

This invention relates to the field of laminated automotive glazing.

BACKGROUND OF THE INVENTION

A trend in the automotive industry has been the expanded use of laminated glazing. Laminated glazing, once limited to just the windshield, is finding more and more application in other positions in the vehicle where it serves to improve passenger safety, security, and comfort as well as energy efficiency.

Laminated windshields are made by bonding two sheets of annealed glass together using a thin sheet of a transparent thermo plastic. Annealed glass is glass that has been slowly cooled from the bending temperature down through the glass transition range. This process relieves any stress left in the glass from the bending process. Annealed glass breaks into large shards with sharp edges. When laminated glass breaks, the shards of broken glass are held together, much like the pieces of a jigsaw puzzle, by the plastic layer helping to maintain the structural integrity of the laminate. A vehicle with a broken windshield can still be operated. On impact, the plastic layer also helps to prevent penetration by the occupant in the event of a crash and by objects striking the laminate from the exterior of the vehicle.

Regulatory requirements stipulate that heat strengthened (tempered) glass can be used in all vehicle positions other than the windshield. Heat strengthened (tempered) glass has a layer of high compression on the outside surfaces of the glass, balanced by tension on the inside of the glass. When tempered glass breaks, the tension and compression are no longer in balance and the glass breaks into small beads with dull edges. Tempered glass is much stronger than annealed laminated glass. However, the glass thickness limits of the typical automotive heat strengthening process are in the 3.2 mm to 3.6 mm range. Thinner glass cannot be strengthened to the level needed to meet the regulatory requirements for safety glazing with the conventional low-pressure air tempering systems in common use in the automotive glass industry.

The glass used in the doors, rear and side windows of most vehicles is made from tempered glass. While laminated glass is allowed for these positions, tempered glass can be produced at a much lower cost than laminated glass. While tempered glass can withstand high loads, it can be easily broken by striking with a hard object. When tempered glass fails, the entire window opening is left unprotected.

As a result, on some vehicles, laminated glass has been used for the doors and some other positions in place of tempered glass. This is in part to improve the safety and security of the occupants. Laminated glass also improves occupant retention in the event of a rollover accident. It takes much longer to break into a vehicle with laminated glass, making the vehicle more secure from attack. Laminated glass also provides improved sound dampening for a quieter ride. The soft plastic layer acoustically decouples the two glass layers which helps to reduce the transmission of sound through the glass. Improvements of noise reduction greater than 6 dB have been recorded. A laminate also allows for the use of heat reflecting coatings and films, which require lamination to protect the coating/film, for improved solar control.

Problems are encountered when designing a laminated version of a tempered part when the tempered part has holes. Holes are commonly used in tempered parts to attach and mount the glass to the vehicle. Laminated glass typically is not manufactured with holes for a number of reasons. The primary one is that annealed glass is not as strong as tempered glass. Fully tempered glass is 4 to 5 times stronger than annealed laminated glass. As mentioned, glass that is less than 3.2 mm thick cannot be fully tempered. Thus, a laminated version of a tempered part will have a higher probability of breakage and may not be possible to use in some applications such as frameless door windows.

Looking at glass at the molecular level, we would expect the strength of glass to be in the 45 GPa range. However, we find that the actual strength is orders of magnitude lower than the predicted potential strength. The raw flat glass produced by the float process, appears to be nearly perfect to the naked eye. During manufacture, the glass is inspected by machine and any visible defects are detected and discarded. The near visually perfect glass will still have surface defects at the microscopic level. These come from contact with the float line rollers, cutting, handling, interleaving material, contact with other plates of glass and various other sources. Additional defects are introduced during the glass bending process as well. The distribution of these defect on the surface and severity is random and follows a normal distribution.

Glass has very high compressive strength and almost always fails in tension due to these surface defects. Under compression, this surface defects are forced in the closed direction and cannot open. But, under tension, the surface defects are pulled in the open direction. The surface defects or cracks serve as the weakest link under tension. Due to the near perfect elastic behavior of glass, the glass cannot deform to relieve the stress but instead does the opposite with the defects acting as stress concentrators. Surface defects, most of which are microscopic on new glass, when stressed in the open direction, will grow if the stress is above a certain critical value. This is known as slow crack growth (SCG). This is not a linear function. Crack growth accelerates with tension and duration.

When a part containing a hole is tempered, the entire surface of the part including the edges of the hole, is placed in compression. For the part to break, the part must be loaded beyond its compressive strength and placed in tension. This is why tempered parts are so much stronger than annealed glass parts. An annealed part, when loaded, will go into tension at a much lower level.

Another problem is related to the tolerance stack. For each hole in the laminate, holes must be drilled in both the inner glass 202 and the outer glass layer 201. Each hole has a location and diameter tolerance plus there is a mismatch tolerance applied to the two glass layers relative to each other in the laminate. As a result, the hole cannot be located as accurately as in a tempered part.

Laminates of the prior art have attempted a number of approaches to solve these problems with varying success.

Many of the vehicles currently in production make use of clips with holes or threaded inserts that are bonded to the glass. The clips subsequently attach to the mounting means in the vehicles. The main drawback to this method, in addition to the added cost and weight and lack of direct interchangeability with a conventional tempered part with drilled holes, is that it is difficult to bond the clip to the glass such that the bond will last the life of the vehicle. The adhesives known and in use do not have zero creep and will tend to pull away from the glass over time. Also, the adhesive is subject to long-term environmental degradation in the harsh automotive environment. The inside of a car door can see temperatures in excess of 80° C. on a hot sunny day.

On some laminated parts with holes, the diameter of the hole is increased to compensate for the tolerance stack. This allows for the fastener to pass through the mounting means but does nothing to address the lack of strength. The overall thickness of the laminate has been increased to increase the strength, but this then requires that a different mechanism be used on vehicles so equipped to accommodate the greater thickness. This is more of a problem where laminated glazing is offered as an option and does not appear on all of the vehicles produced in that model line.

One innovative method has been to strengthen one or more of the glass layers by means of chemical tempering. This allows for the use of thinner glass but the hole remains a problem. The mounting means will typically compress the glass placing the areas near the edge of the fastening means in tension which increases the probability of breakage over time. This is due to the soft plastic bonding layer used to laminate the glass layers together.

In addition, on movable parts, like side door windows, especially frameless door windows, the glass will experience a torque and bending moment when the glass moves up and down in the channel, when the door is slammed, under wind load and when force is applied to an open window by grabbing, pushing or pulling on the exposed edge.

A number of methods that attempt to overcome this problem involving making the inner glass layer smaller than the outer layer such that the inner layer does not overlap the outer layer where the holes are located to that the mounting means is only in contact with the stronger outer glass. The drawback of this is that the area where the two layers do not overlap is weaker as compared to the overlapping full laminated portions. In the event of breakage, the non-overlapping area will experience total failure leaving the failed laminated portion separate from the mounting means. This non-overlap monolithic area will also see high torque during operation as the window moves up and down in the case of door windows and other movable positions.

It would be desirable overcome these limitations providing for a laminated glazing with one or more holes that is a direct replacement for a tempered part but with the full benefits in terms of security, safety and comfort as a full laminate.

BRIEF SUMMARY OF THE INVENTION

The invention provides for a laminated glazing with at least one hole. The outer, exterior facing glass layer 201 is fabricated to the nominal glass size with holes drilled through as needed.

The inner or interior facing glass layer 202 is cut to size such that: the edge of glass is offset by at least 0.5 m to 3 mm inboard from the outer glass layer edge, the lower edge of the inner glass extends at least 20 mm below the beltline, preferably at least 30 mm. The lower edge of the glass does not overlap the hole or holes in the outer glass and is extended sufficient that it at least partially overlaps the mounting means and will be captured by said mounting means.

At least a portion of the edge on the inner glass layer is ground to a chamfered or bullnose profile and may be polished as well to further improve edge strength.

The laminate may be further strengthened by means of laminated inserts.

To laminate inserts, the plastic interlayer is cut to size with a cut out 22 in the interlayer in the area near the holes. The cut out 22 is sized to accommodate an insert. An insert 9, of about the same thickness as the interlayer layer is fabricated to fit the cutout 22. The insert 9 is placed into the cut out during the assembly of the laminated and then laminated as a permanent part of the glazing. An adhesive may be used to temporarily hold the insert in place. The insert 9 serves to strengthen the glass and distribute any forces applied to the laminate by the mounting means.

One of the inserts' primary functions is to prevent compression of the glass layers. Therefore, the insert does not need to extend to the edge of the inner glass layer. Once mounted in the vehicle, the mounting means places the glass layers in compression further strengthening the assembly and improving resistance to breakage as well as overall stiffness.

To further improve stiffness and retention by the mounting means, the inserts may extend beyond the lower edge of the inner glass layer. The insert may overlap the hole provided that the insert also is provided with a hole. The insert may be extended inboard towards and beyond the mounting means overlap towards the beltline.

In addition to or in place of the portion of the insert which is inside of the laminate, a reinforcement may be extended such that it overlaps both the inner and outer glass layers and is bonded to the inner and outer layers as illustrated in FIGS. 12A, 12B and 13.

The invention is not limited to laminates comprising a single continuous non-laminated portion along the bottom of the outer glass layer. Often times, the portion between the mounting holes is cut out in order to reduce weight. As a result, the inner glass layer may serve to divide non-overlapping portion of the outer glass into multiple areas. The hybrid laminate of the invention may have more than one portion of the outer glass that is not laminated as shown in FIGS. 14A and 14B. The same methods apply.

Advantages

Enables use of laminated glazing with holes
Lower distortion
Resistant to breakage.
Direct replacement for tempered part.
Same of better durability as tempered.
Same or less thickness as tempered.
Lower weight.
Improved security.
Improved safety.
Improved comfort.
Superior acoustic dampening.
Superior solar control.
Enables use of ultra-thin glass.
Fabricated using standard automotive glass processes.

REFERENCE NUMERALS OF DRAWINGS

Figure 1A:
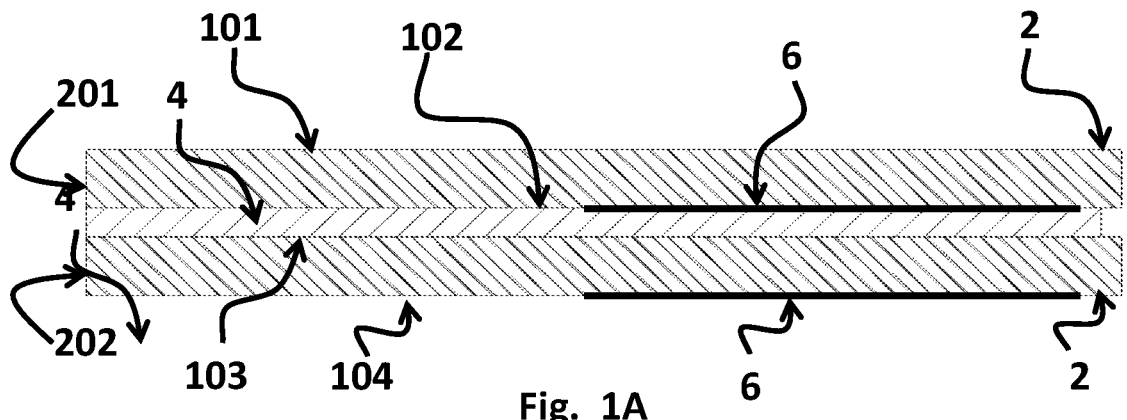
FIG. 1A shows a cross section of a typical laminated automotive glazing.

2 Glass
4 Plastic bonding layer (interlayer)
6 Obscuration
9 Insert
12 Film
18 Coating
20 Hole
22 Cutout
24 Beltline
30 Edge of glass
32 Glazing mounting means
34 Stopper
36 Retention holes
38 Reinforcement
101 Surface one
102 Surface two
103 Surface three
104 Surface four
201 Outer layer
202 Inner layer

DETAILED DESCRIPTION OF THE INVENTION

The following terminology is used to describe the laminated glazing of the invention.

A glazing is an article comprised of at least one layer of a transparent material which serves to provide for the transmission of light and/or to provide for viewing of the side opposite the viewer and which is mounted in an opening in a building, vehicle, wall or roof or other framing member or enclosure.

Laminates, in general, are articles comprised of multiple sheets of thin, relative to their length and width, material, with each thin sheet having two oppositely disposed major faces and typically of relatively uniform thickness, which are permanently bonded to one and other across at least one major face of each sheet.

Laminated safety glass is made by bonding two sheets (201 & 202) of annealed glass 2 together using a plastic bonding layer comprised of a thin sheet of transparent thermoplastic 4 (interlayer) as shown in FIG. 1.

Figure 1B:
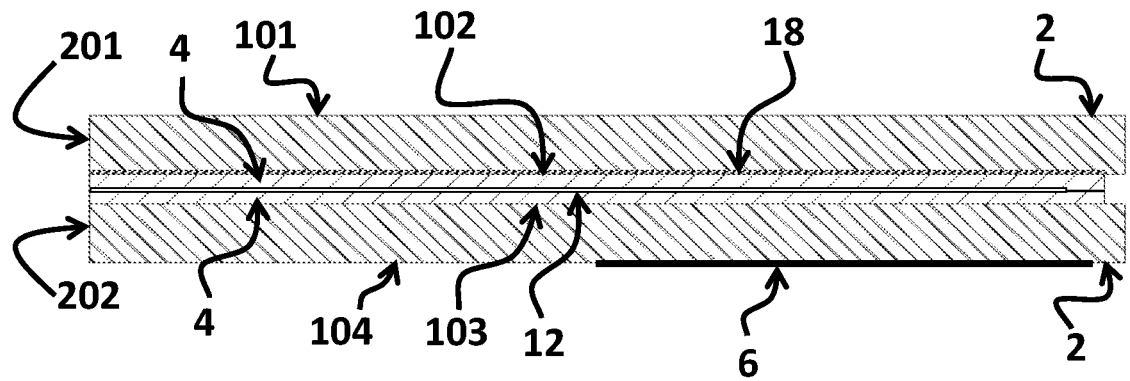
FIG. 1B shows a cross section of a typical laminated automotive glazing with performance film and coating.

Typical automotive laminated glazing cross sections are illustrated in FIGS. 1A and 1B. Laminated safety glass is comprised of two layers of glass, the exterior or outer 201 and interior or inner 202 that are permanently bonded together by a plastic layer 4 (interlayer). In a laminate, the glass surface that is on the exterior of the vehicle is referred to as surface one 101 or the number one surface. The opposite face of the exterior glass layer 201 is surface two 102 or the number two surface. The glass 2 surface that is on the interior of the vehicle is referred to as surface four 104 or the number four surface. The opposite face of the interior layer of glass 202 is surface three 103 or the number three surface. Surfaces two 102 and three 103 are bonded together by the plastic layer 4. An obscuration 6 may be also applied to the glass. Obscurations are commonly comprised of black enamel frit printed on either the number two 102 or number four surface 104 or on both. The laminate may have a coating 18 on one or more of the surfaces. The laminate may also comprise a film 12 laminated between at least two plastic layers 4.

Figure 1C:
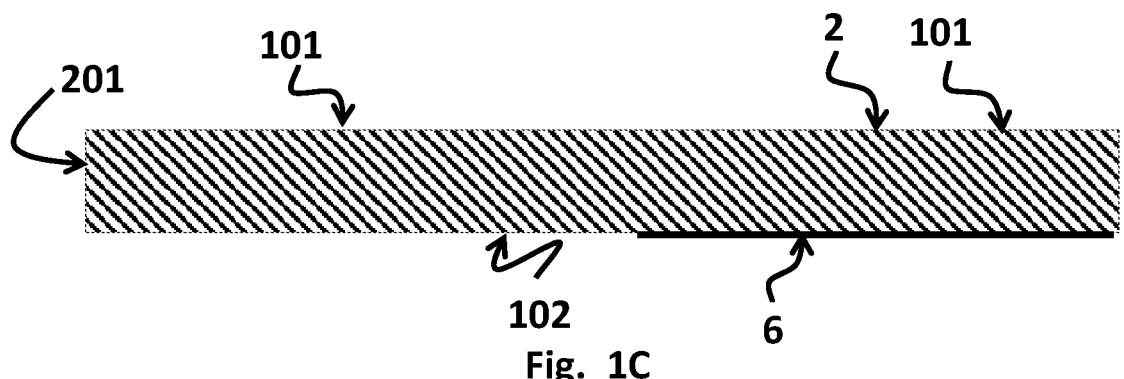
FIG. 1C shows a cross section of a typical tempered monolithic automotive glazing.

FIG. 1C shows a typical tempered automotive glazing cross section. Tempered glazing is typically comprised of a single layer of glass 201 which has been heat strengthened. The glass surface that is on the exterior of the vehicle is referred to as surface one 101 or the number one surface. The opposite face of the exterior glass layer 201 is surface two 102 or the number two surface. The number two surface 102 of a tempered glazing is on the interior of the vehicle. An obscuration 6 may be also applied to the glass. Obscurations are commonly comprised of black enamel frit printed on the number two 102 surface. The glazing may have a coating 18 on the surface one 101 and/or surface two 102.

The plastic bonding layer 4 has the primary function of bonding the major faces of adjacent layers to each other. The material selected is typically a clear plastic when bonding to another glass layer 2. For automotive use, the most commonly used bonding layer 4 or interlayer is polyvinyl butyl (PVB). In addition to polyvinyl butyl, ionoplast polymers, ethylene vinyl acetate (EVA), cast in place (CIP) liquid resin and thermoplastic polyurethane (TPU) can also be used. Interlayers are available with enhanced capabilities beyond bonding the glass layers together. The invention may include interlayers designed to dampen sound. Such interlayers are comprised whole or in part of a layer of plastic that is softer and more flexible than that normally used.

The types of glass that may be used include but are not limited to: the common soda-lime variety typical of automotive glazing as well as aluminosilicate, lithium aluminosilicate, borosilicate, glass ceramics, and the various other inorganic solid amorphous compositions which undergo a glass transition and are classified as glass included those that are not transparent. The glass layers may be comprised of heat absorbing glass compositions as well as infrared reflecting and other types of coatings.

Most of the glass used for containers and windows is soda-lime glass. Soda-lime glass is made from sodium carbonate (soda), lime (calcium carbonate), dolomite, silicon dioxide (silica), aluminum oxide (alumina), and small quantities of substances added to alter the color and other properties.

Borosilicate glass is a type of glass that contains boric oxide. It has a low coefficient of thermal expansion and a high resistance to corrosive chemical. It is commonly used to make light bulbs, laboratory glassware, and cooking utensils.

Aluminosilicate glass is made with aluminum oxide. It is even more resistant to chemicals than borosilicate glass and it can withstand higher temperatures. Chemically tempered Aluminosilicate glass is widely used for displays on smart phones and other electronic devices.

Lithium-Aluminosilicate is a glass ceramic that has very low thermal expansion, optical transparency and high. It typically contains 3-6% Li2O. It is commonly used for fireplace windows, cooktop panels, lenses and other applications that require low thermal expansion.

Infrared reflecting coatings include but are not limited to the various metal/dielectric layered coatings applied though magnetron sputtered vacuum deposition (MSVD) as well as others known in the art that are applied via pyrolytic, spray, CVD, dip and other methods.

Infrared reflecting films include both metallic coated substrates as well as organic based optical films which reflect in the infrared.

The use of thin glass layers has been found to improve resistance to breakage from impact such as from stone chips. The thinner glass is more flexible and absorbs the energy of the impact by deflecting and then bouncing back rather than breaking as is the case with a thicker stiffer layer of glass. Also, embodiments comprising a borosilicate outer layer are substantially more resistant to impact than soda lime glass due to the nature of the composition. Embodiments comprising a chemically tempered layer will also exhibit superior resistance to impact as compared to ordinary soda-lime glass due to the high surface compression of such glasses.

The glass layers may be formed by any appropriate means known in the art including but not limited to: gravity bending, partial and full surface press bending and singlet bending.

Cold bending is a relatively new technology. As the name suggest, the glass is bent, while cold to its final shape, without the use of heat. On parts with minimal curvature a flat sheet of glass can be bent cold to the contour of the part. This is possible because as the thickness of glass decreases, the sheets become increasingly more flexible and can be bent without inducing stress levels high enough to significantly increase the long-term probability of breakage. Thin sheets of annealed soda-lime glass, in thicknesses of about 1 mm, can be bent to large radii cylindrical shapes (greater than 6 m). When the glass is chemically, or heat strengthened the glass can endure much higher levels of stress and can be bent along both major axes. The process is primarily used to bend chemically tempered thin glass sheets (<=1 mm) to shape.

Cylindrical shapes can be formed with a radius in one direction of less than 4 meters. Shapes with compound bend, that is curvature in the direction of both principle axis can be formed with a radius of curvature in each direction of as small as approximately 8 meters. Of course, much depends upon the surface area of the parts and the types and thicknesses of the substrates.

The cold bent glass will remain in tension and tend to distort the shape of the bent layer that it is bonded to. Therefore, the bent layer must be compensated to offset the tension. For more complex shapes with a high level of curvature, the flat glass may need to be partially thermally bent prior to cold bending.

The glass to be cold bent is placed with a bent to shape layer and with a bonding layer placed between the glass to be cold bent and the bent glass layer. The assembly is placed in what is known as a vacuum bag. The vacuum bag is an airtight set of plastic sheets, enclosing the assembly and bonded together it the edges, which allows for the air to be evacuated from the assembly and which also applies pressure on the assembly forcing the layers into contact. The assembly, in the evacuated vacuum bag, is then heated to seal the assembly. The assembly is next placed into an autoclave which heats the assembly and applies high pressure. This completes the cold bending process as the flat glass at this point has conformed to the shape of the bent layer and is permanently affixed. The cold bending process is very similar to a standard vacuum bag/autoclave process, well known in the art, except for having an unbent glass layer added to the stack of glass.

The beltline is the line formed by the lower visible edge of the vehicle glazing. The beltline of the vehicle front and rear doors is the portion where the door window seals come into contact with the glass. The portion of the door glazing that is below the beltline is not visible.

The glass layers may be annealed or strengthened. There are two processes that can be used to increase the strength of glass. They are thermal strengthening, in which the hot glass is rapidly cooled (quenched) and chemical tempering which achieves the same effect through an ion exchange chemical treatment.

Heat strengthened, full temper soda-lime float glass, with a compressive strength in the range of at least 70 MPa, can be used in all vehicle positions other than the windshield. Heat strengthened (tempered) glass has a layer of high compression on the outside surfaces of the glass, balanced by tension on the inside of the glass which is produced by the rapid cooling of the hot softened glass. When tempered glass breaks, the tension and compression are no longer in balance and the glass breaks into small beads with dull edges. Tempered glass is much stronger than annealed laminated glass. The thickness limits of the typical automotive heat strengthening process are in the 3.2 mm to 3.6 mm range. This is due to the rapid heat transfer that is required. It is not possible to achieve the high surface compression needed with thinner glass using the typical blower type low pressure air quenching systems.

In the chemical tempering process, ions in and near the outside surface of the glass are exchanged with ions that are larger. This places the outer layer of glass in compression. Compressive strengths of up to 1, 000 MPa are possible. The typical methods involved submerging the glass in a tank of molten salt where the ion exchange takes place. The glass surface must not have any paint or coatings that will interfere with the ion exchange process.

The invention is comprised of a laminate having two glass layers with each having opposed major faces bonded together permanently by at least one plastic bonding layer and having at least one hole.

The outer layer 201 is cut and the hole or holes are cut in the same manner as would a tempered part.

No holes are cut in the inner glass layer 202. The inner glass layer is cut such that the inner glass layer does not overlap the hole or holes in the outer glass layer. Preferably, the edge of the inner glass layer extends to just above the edge of the hole or holes in the outer glass layer. In this manner, the mounting means will capture at least a part of the inner glass layer and plastic interlayer serving to retain the laminate in the event of breakage.

Figure 8A:
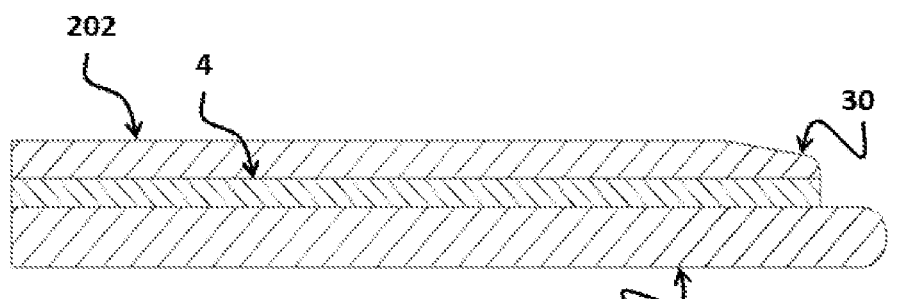
FIG. 8A shows an edge work—chamfered.
Figure 8B:
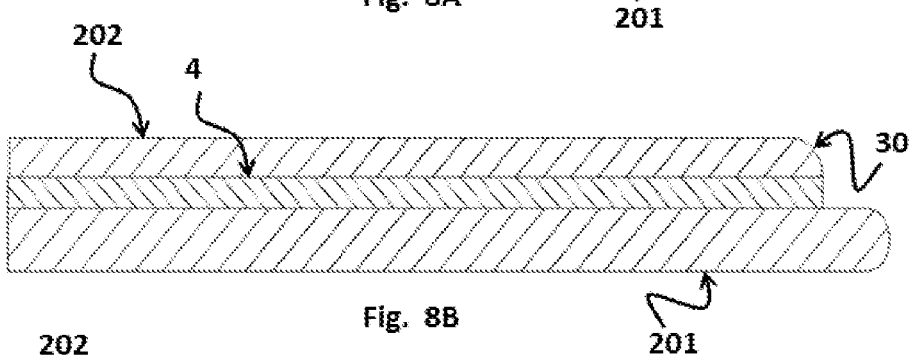
FIG. 8B shows an edge work—bullnose.
Figure 8C:
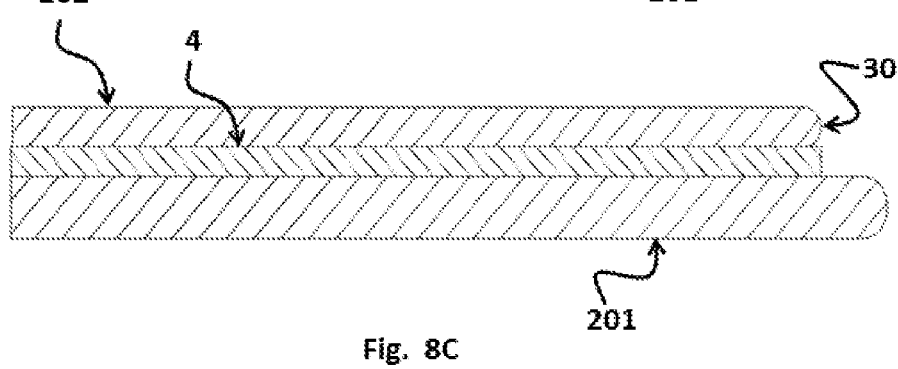
FIG. 8C shows an edge work—C shape.

The typical edge finish used for laminated and tempered glass is a diamond ground edge with a C shaped profile (FIG. 8C). This is fine for the outer glass layer. For the inner glass layer, it has been found that the probability of breakage is greatly reduced by offsetting the edge of the inner glass inboard form the edge of the outer glass layer, along at least a portion of the edge including the exposed portion of the edge on movable parts. The larger outer glass layer is thus positioned to protect the thinner and weaker inner glass edge. Further improvement is made by diamond grinding the inner glass edge to a chamfer (FIG. 8A) or for even better results a bullnose (FIG. 8B).

A cutout is made in the plastic bonding layer 4 such as to expose the number two surface 102 of the outer glass layer 201 in the areas in and surrounding the hole(s).

An insert 9 is fabricated to fit into the cutout. The inserts' primary function is to prevent compression of the glass layers by the mounting means during installation and during use. Therefore, the insert does not need to extend to the edge of the inner glass layer. It may be rectangular or circular in shape. It also does not need to be as large as the portion of the mounting means that overlaps the insert. Alternately, the insert 9 may extend substantially beyond the edge of the inner glass layer 202. The insert may be as large or larger than the overlapping portion of the mounting means. The insert may extend beyond the edge of the inner glass layer and overlap the hole in the outer glass layer 201. The insert 9 may have a hole 20 corresponding to the hole 20 in the outer glass layer 201. The insert may be thicker that the plastic bonding layer in the area beyond the edge of the inner glass layer. The insert may be bonded to the glass. Once mounted in the vehicle, the mounting means places the glass layers in compression further strengthening the assembly and improving resistance to breakage as well as overall stiffness.

The insert 9 can be fabricated from any suitable material that can provide the strength needed. Potential materials include but are not limited to: annealed glass, chemically strengthened glass, heat strengthened glass, carbon fiber composite, steel, aluminum, titanium, plastic and fiberglass reinforced plastic all may be suitable depending upon the exact application and loading.

The insert may be temporarily held in place my means of an adhesive. If the lamination assembly process accommodates the insert may be held in place by just the pressure and friction from the glass and interlayer. If the insert does not extend to the edge of glass or beyond, it may be captured by the cut out in the plastic bonding layer. An autoclave is used to apply heat and pressure to the assembled laminate to complete the lamination process.

If the insert extends beyond the edge of glass, the insert 9 can be bonded to the outer glass surface using any adhesive which is suitable for the materials examples of which include but are not limited to moisture cure and two component polyurethane. This step can be completed before or after the autoclave cycle.

The insert may be further strengthened and stiffened by the addition of additional components. An example would be an injected molded, cast or machined reinforced insert.

The chemically or thermally strengthened outer glass layer, when broken is likely to detach from the mounting means. An external impact is likely to only break the outer glass layer as the outer layer will absorb and dissipate the energy from most impacts. The broken outer layer will be held together in the portion of the glazing that is laminated by the intact inner layer and the interlayer. The overlap of the inner glass layer and interlayer with the mounting means will allow the glazing to remain in place in the opening and possibly for limited movement until it can be replaced.

The use of insert further enhances retention of the glazing in the mounting system.

In place of or in conjunction with the use of inserts a number of other means may be used to enhance retention of the laminate in the opening in the event of breakage by modifying the laminate along at least a portion of the non-overlapping area of the laminate in the area where the mounting means is attached.

Figure 9A:
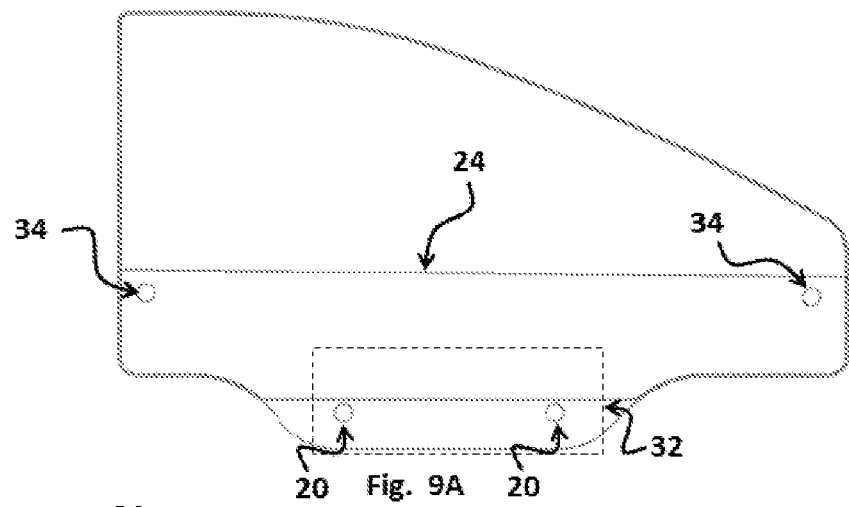
FIG. 9A shows a laminate with stopper.
Figure 9B:
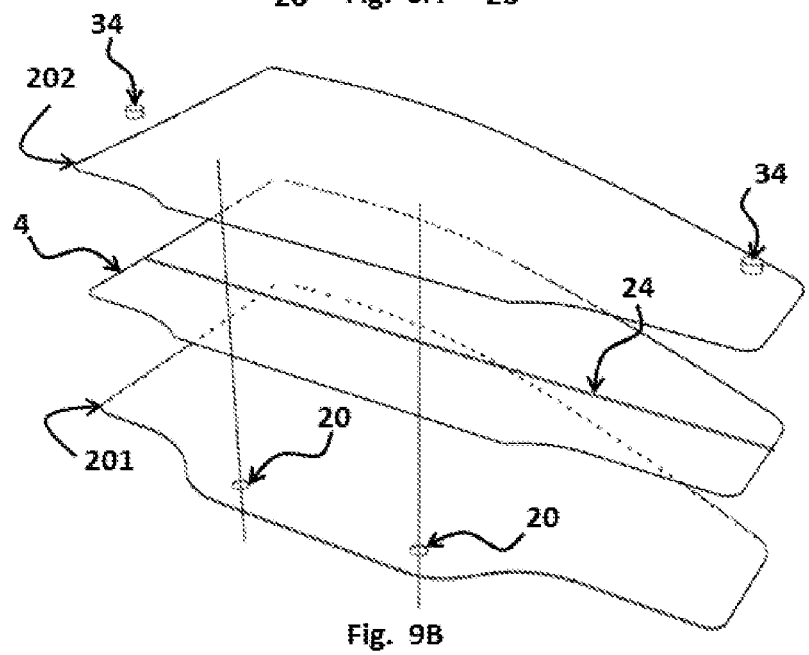
FIG. 9B shows an exploded view of 9A.

The use of a stopper 34 is shown in FIGS. 9A and 9B. The stopper 34 is attached to the glass below the belt line 24 where it serves to prevent the ejection of the laminate through the top seals in the event that the outer glass layer 201 should break. The inner glass layer 202 and the plastic interlayer will hold the broken pieces together. The main criteria for the stopper 34 is that it should be sized such that the glazing cannot pass through the opening and seal in the opening. In the embodiment illustrated the stoppers 34 are 12 mm in diameter and have a height of 12 mm. They are fabricated from plastic and bonded to the glass centered 25 mm below the beltline 24.

Figure 11A:
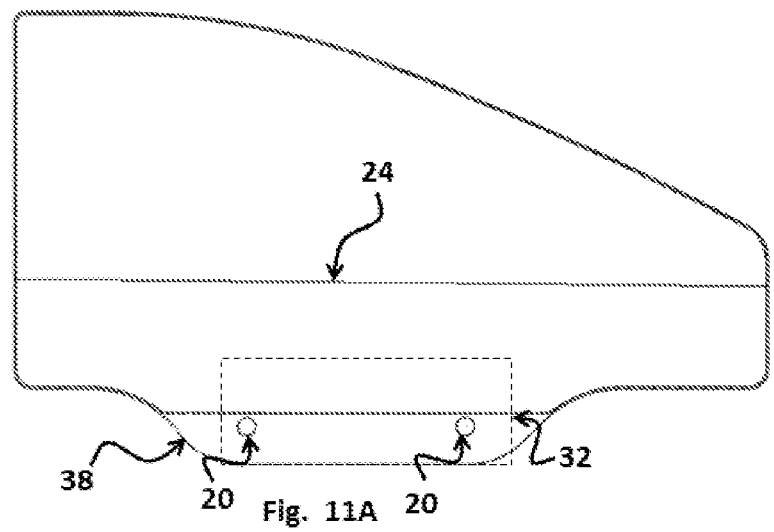
FIG. 11A shows a laminate with reinforcement.
Figure 11B:
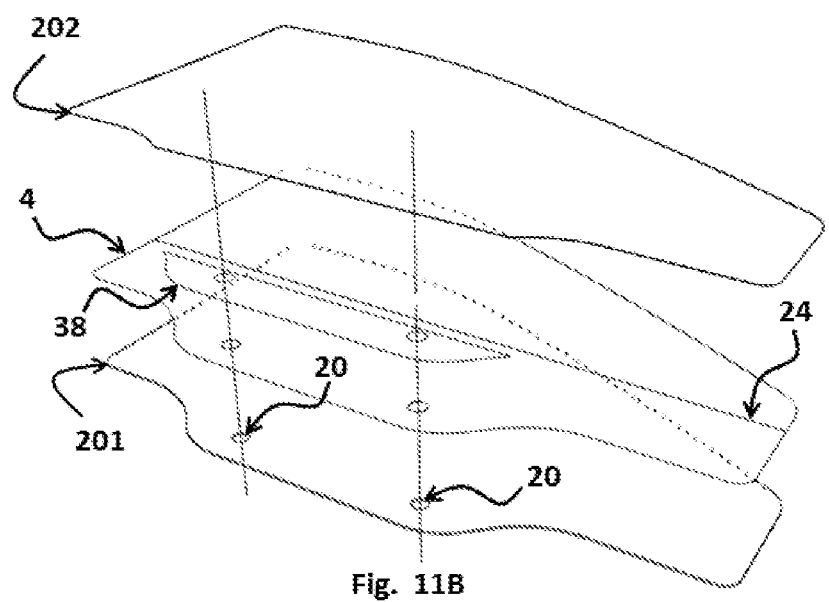
FIG. 11B shows an exploded view of 11A.

Another method that can be used is to extend the plastic interlayer to overlap the mounting means contact area as shown in FIGS. 11A and 11B. The interlayer by itself will help hold the broken pieces together inside of the mounting means. Further improvement in retention is possible by reinforcing this area. The interlayer may be used to bond, during the autoclave cycle various materials. A thin layer of PET will improve retention and protect the interlayer, preventing degradation from exposure to moisture. The reinforcement 38 may be made of a more substantial material such as a mesh made of carbon, glass or aramid fiber. The reinforcement may be solid and constructed of plastic or metal. Rather than attaching the reinforcement using the extended PVB, it may be attached by any other suitable bonding means such as a polyurethane adhesive.

The reinforcement needs to be made of a stiff material. A layer of thick polyurethane has been shown to serve the purpose just as well as it maintains high adhesion to the glass while preventing the broken pieces from separating. Other flexible materials and coatings may also be utilized to serve this same function.

The reinforcement need not overlap the entire exposed area. Indeed, it can be substantially less and be just as effective. The only real requirement that it at least partially extend and overlap the mounting means, otherwise, it cannot improve glazing retention.

The primary problem with holes through the laminate come from the forces applied to the hole during installation and use. Another method to enhance retention of the glazing in the opening after breakage makes use of a secondary set of holes in the glass which pass through both of the glass layers and the interlayers. These are just secondary holes which will only see any force applied if the primary mounting holes should fail. The concept in illustrated in FIGS. 10A and 10B. The secondary holes 36 have a diameter of 12 mm and are located 50 mm above the primary mounting holes 20. A corresponding set of holes in the mounting means secures the secondary hole 36 my means of a fastening means which does not compress the laminate or apply any force to the edges. One means to accomplish this is through the use of an undersized shoulder bolt. The shoulder prevents compression of the glass and by sizing sufficiently undersize, the bolt can still bear the weight of the glazing in the event of breakage until it can be replaced without stressing the glazing during normal use. Another fastening means is an expanding plastic pin. These methods may be used independently or in combination.

DETAILED DESCRIPTION OF THE EMBODIMENTS

Figure 2A:
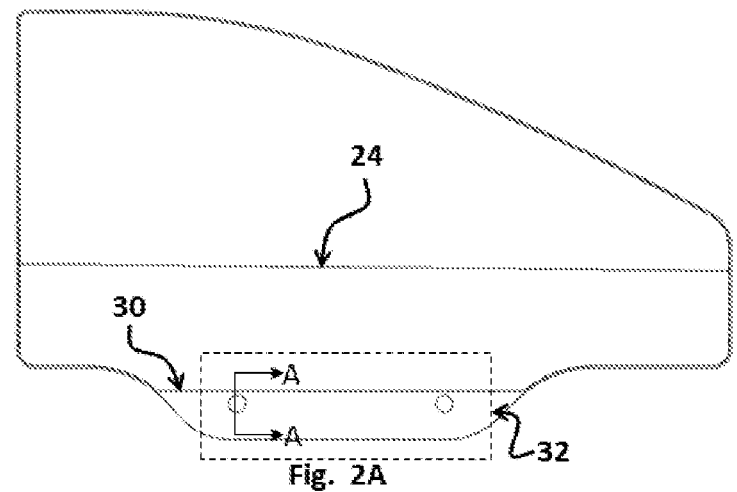
FIG. 2A shows a laminate with non-overlapping inner glass layer.
Figure 2B:
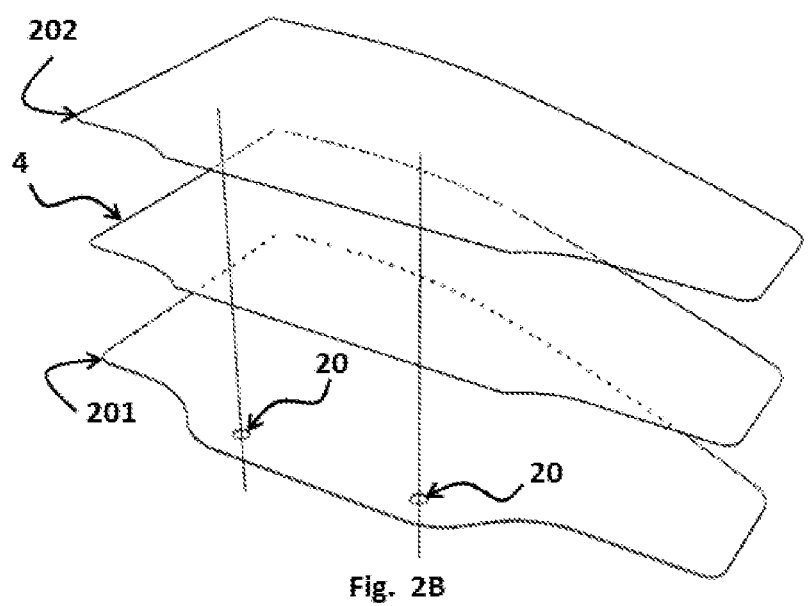
FIG. 2B shows an exploded view of 2A.
Figure 6A:
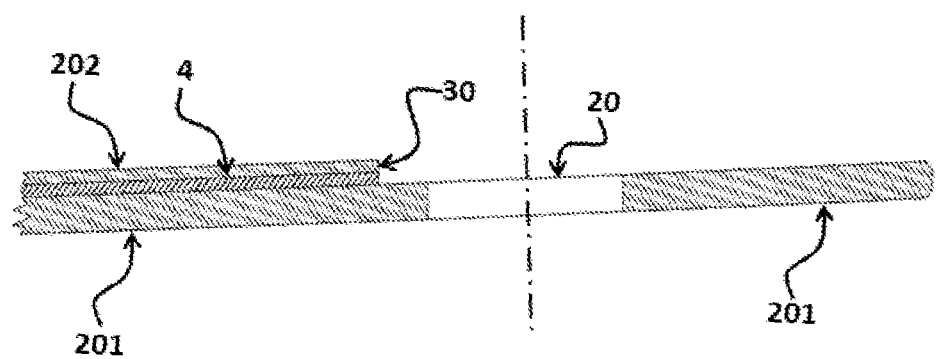
FIG. 6A shows a cross section AA in FIG. 2A.

1. A movable door window (sidelite) with a set of two holes is illustrated in FIGS. 2A, 2B and 6A.

The thermally strengthened outer glass layer is comprised of 3.0 mm soda-lime solar green glass 201 has two 24 mm holes 20 used to mount the glass to the lift rail (mounting means 32) in the window mechanism.

The inner glass layer 202 is comprised of clear 1.0 mm chemically tempered aluminosilicate glass. The edge of the inner glass layer is offset inboard from the outer glass edge of glass by 2 mm along the top and sides. The bottom edge of the inner glass 202 ends 3 mm above the top edge of the holes 20 and extends in excess of 20 mm below the beltline 24.

The mounting means 32 is attached to the laminate through the holes 20 and overlaps the inner glass layer 202 by 25 mm capturing both the inner 202 and outer 201 glass layers. The edge of the inner glass layer 202 is diamond ground to a bullnose profile and further polished. The inner glass layer 202 does not have a hole in it.

A high module of elasticity (50 MPa) plastic interlayer 4 is used to laminate the two glass layers to each other. The extended bottom edge of the inner glass layer and stiff interlayer provides for greater resistance against torque during use.

Figure 3A:
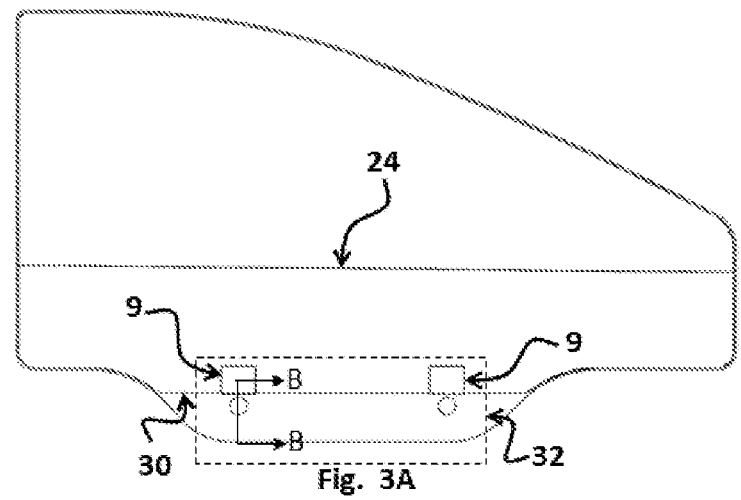
FIG. 3A shows a laminate with insert.
Figure 3B:
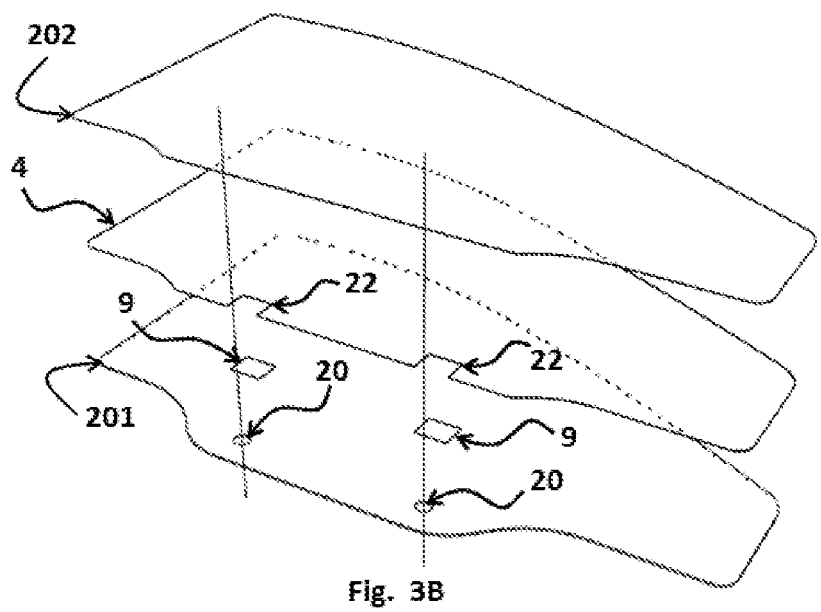
FIG. 3B shows an exploded view of 3A.
Figure 6B:
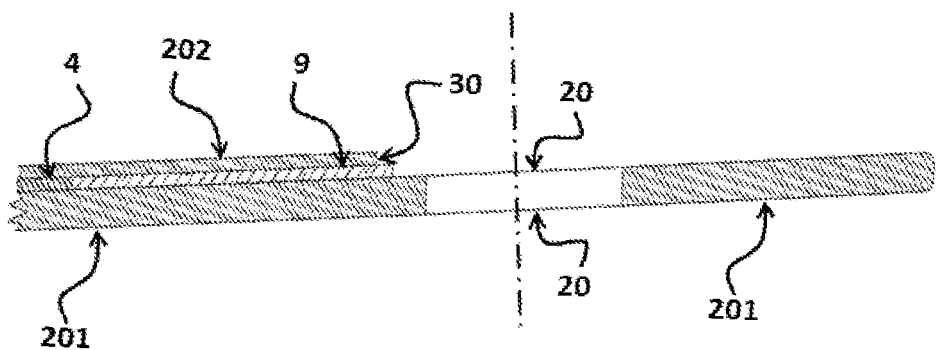
FIG. 6B shows a cross section BB in FIG. 2B.

2. Embodiment 2 is the same as embodiment 1 with the addition of an insert 9 to further improve the strength of the laminate as illustrated in FIGS. 3A, 3B and 6B. Cutouts 22 have been made in the plastic interlayer 4 to accommodate the inserts 9. The inserts 9 are 50 mm and extend from approximately the lower edge of the inner glass layer 202 to 35 mm inboard. The inserts 9 are made from a hard plastic and have a thickness of 0.76 mm.

Figure 4A:
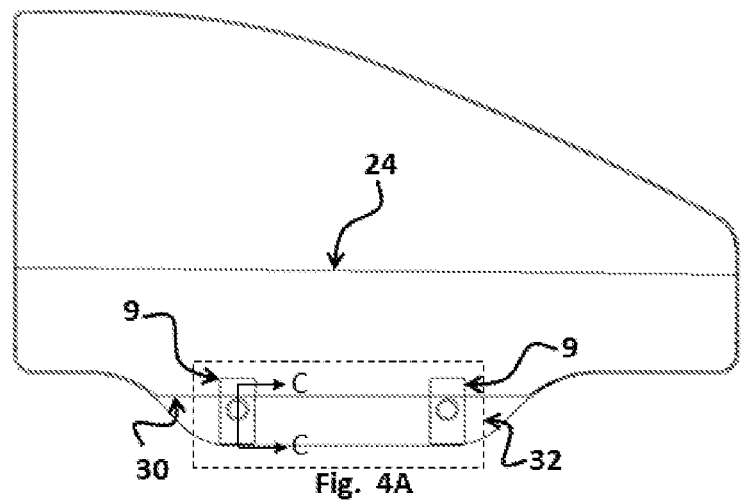
FIG. 4A shows a laminate with insert extending over hole.
Figure 4B:
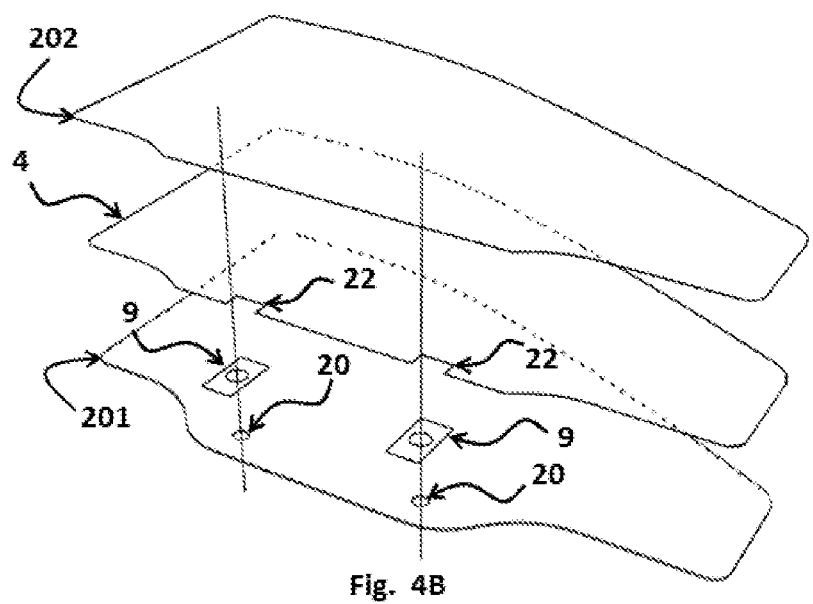
FIG. 4B shows an exploded view of 4A.
Figure 7A:
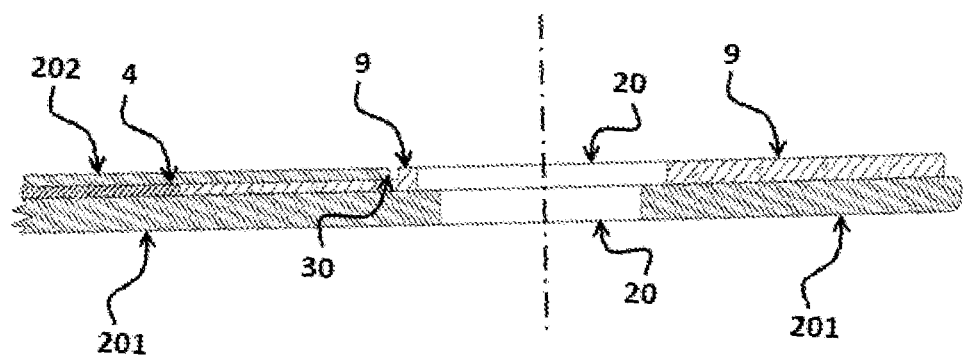
FIG. 7A shows a cross section CC in FIG. 2C.

3. Embodiment 3 is the same as embodiment 1 with the addition of an insert 9 to further improve the strength of the laminate as illustrated in FIGS. 4A, 4B and 7A. Cutouts 22 have been made in the plastic interlayer 4 to accommodate the inserts 9. The inserts 9 are 50 mm wide and have a 28 mm diameter hole 20 in each. The inserts 9 extend from approximately the lower edge of the outer glass layer 201 to 35 mm inboard of the lower edge of the inner glass layer 202. The laminated portion of the insert 9 has a thickness of 0.76 mm. The portion outside of the laminate has a thickness of 1.76 mm, matching the thickness of the plastic interlayer 4 and the inner glass layer 202.

Figure 5A:
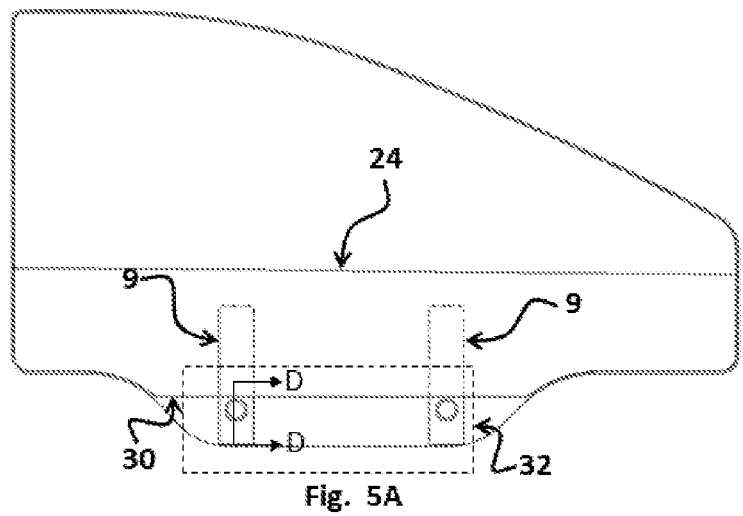
FIG. 5A shows a laminate with insert extending over hole and towards beltline.
Figure 5B:
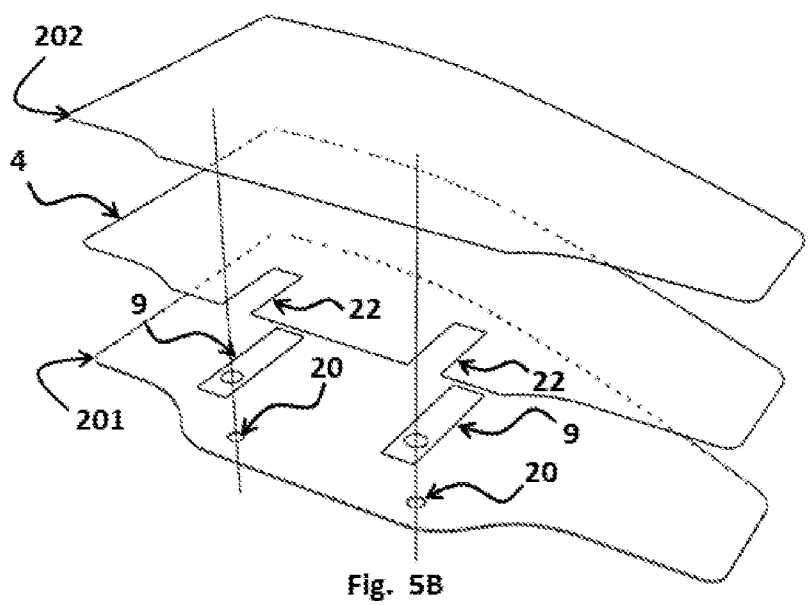
FIG. 5B shows an exploded view of 5A.
Figure 7B:
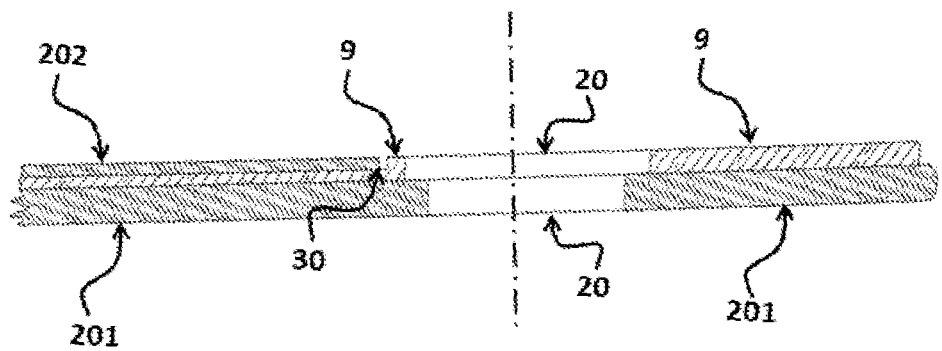
FIG. 7B shows a cross section DD in FIG. 2D.

4. Embodiment 4 is the same as embodiment 1 with the addition of an insert 9 to further improve the strength of the laminate as illustrated in FIGS. 5A, 5B and 7B. Cutouts 22 have been made in the plastic interlayer 4 to accommodate the inserts 9. The inserts 9 are 50 mm wide and have a 28 mm diameter hole in each. The inserts 9 extend from approximately the lower edge of the outer glass layer 201 to within 50 mm of the beltline 24. The laminated portion of the insert 9 has a thickness of 0.76 mm. The portion outside of the laminate has a thickness of 1.76 mm, matching the thickness of the plastic interlayer 4 and the inner glass layer 202.

5. Embodiment 5, illustrated in FIGS. 9A and 9B, is the same as embodiment 1 with the addition of a set of 12 mm diameter by 12 mm high stoppers 34 bonding to the outer glass layer 201 surface, 25 mm centered below the belt line 24 and 50 mm inboard from the fore and aft edge of glass.

Figure 10A:
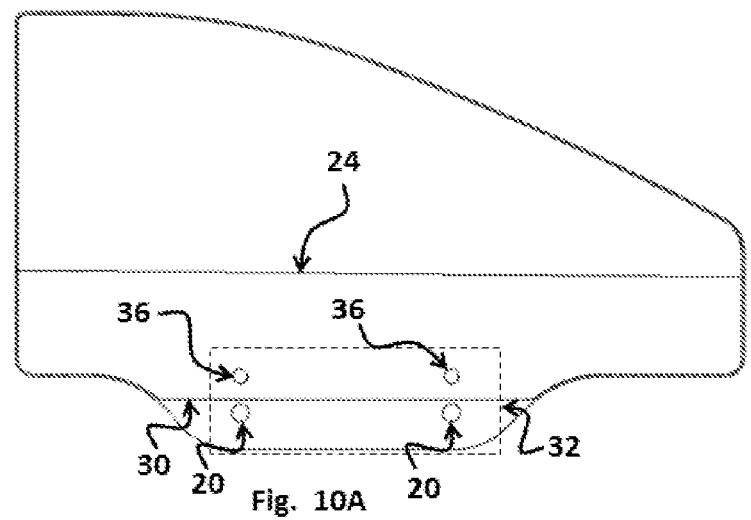
FIG. 10A shows a laminate with retention holes.
Figure 10B:
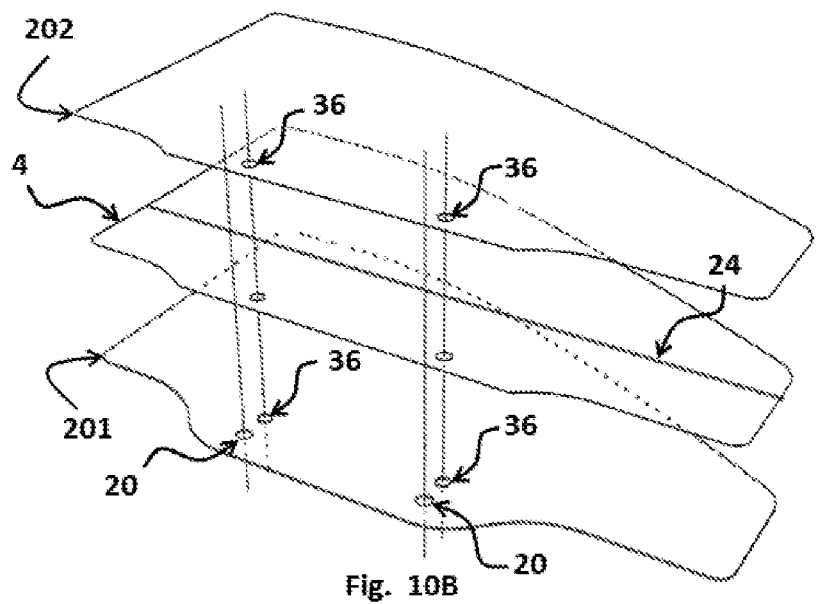
FIG. 10B shows an exploded view of 9A.

6. Embodiment 6, illustrated in FIGS. 10A and 10B, is the same as embodiment 1 with the addition of a set of 12 mm diameter secondary holes 36 passing through the inner 202 an outer 201 glass layers and located 50 mm centered abode the 25 mm primary mounting holes 20. A set of 6 mm shoulder bolts are used to attach the mounting means through the secondary holes 36. The shoulder is greater than the total glass thickness.

7. Embodiment 7, illustrated in FIGS. 11A and 11B, is the same as embodiment 1 with the exception of the interlayer 4 being extended to the edge of the outer glass layer 201.

8. Embodiment 8, illustrated in FIGS. 11A and 11B, is the same as embodiment 1 with the exception of the interlayer 4 being extended to the edge of the outer glass layer 201. A reinforcement 38 comprising fiberglass fiber is bonded to the exposed interlayer 4 during the autoclave process.

9. Embodiment 9, illustrated in FIGS. 11A and 11B, is the same as embodiment 1 with the exception of the interlayer 4 being extended to the edge of the outer glass layer 201. A reinforcement 38 comprising a metal assembly is bonded to the exposed interlayer 4 during the autoclave process.

10. Embodiment 10, illustrated in FIGS. 11A and 11B, is the same as embodiment 1 with the exception of the interlayer 4 being extended to the edge of the outer glass layer 201. The exposed surface 102 of the outer glass layer 201 is coated with a 2 mm thick layer of polyurethane (not shown).

11. Embodiment 11, illustrated in FIGS. 11A and 11B, is the same as embodiment 1 with the exception of the interlayer 4 being extended to the edge of the outer glass layer 201. A reinforcement 38 comprising fiberglass fiber is bonded to the exposed surface 102 of the outer glass layer 201 by means of a polyurethane two-part adhesive.

Figure 12A:
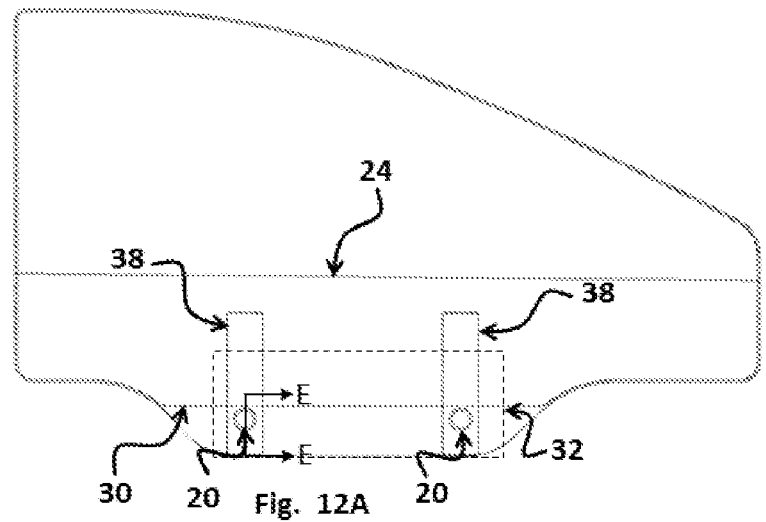
FIG. 12A shows a laminate with insert bonded to inner and outer glass.
Figure 12B:
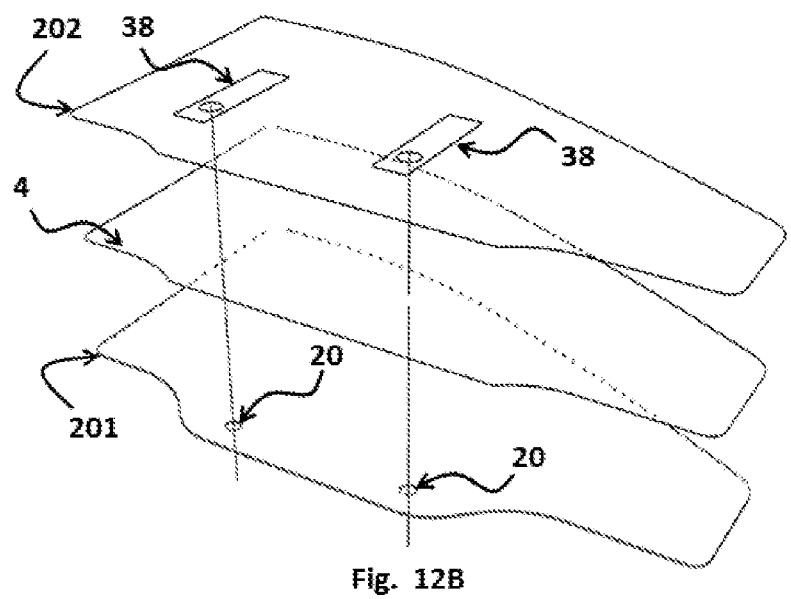
FIG. 12B shows an exploded view of 12A.
Figure 13:
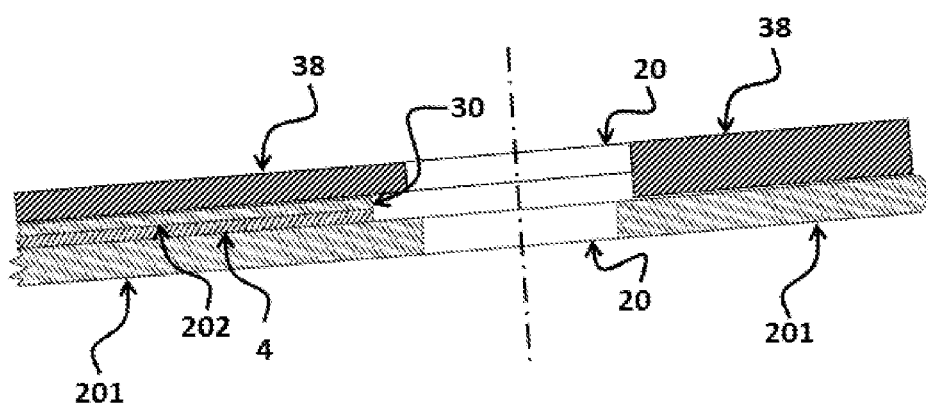
FIG. 13 shows a cross section EE in FIG. 12A.

12. Embodiment 12, illustrated in FIGS. 12A, 12B and 13, is the same as embodiment 1 with the exception of the reinforcement 38 being bonded to the inner and outer glass layers. A reinforcement 38 comprising fiberglass fiber is bonded to the exposed surface 102 of the outer glass layer 201 and the exposed surface 104 of the inner glass layer 202 by means of a polyurethane two-part adhesive.

Figure 14A:
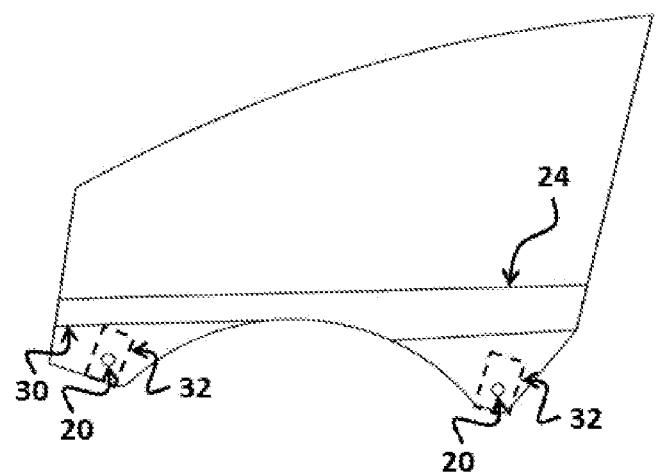
FIG. 14A shows a laminate with non-continuous non-laminated areas.

13. Embodiment 13, illustrated in FIG. 14A, has the same cross section as embodiment one. The shape of the glazing is different than in the previous embodiments. The bottom edge in the area between the mounting holes has been cut out for weight relief. The lower edge of the inner glass layer does not overlap the mounting means. Further, glazing in the lower portion of the outer glass layers has two separate monolithic portions separated by the inner glass layer.

Figure 14B:
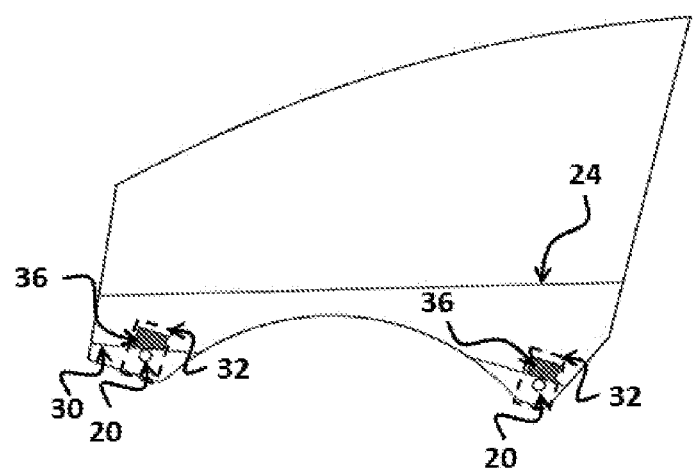
FIG. 14B shows a laminate with inserts and non-continuous non-laminated areas.

14. Embodiment 14, illustrated in FIG. 14B, is the same as embodiment 13 with the exception of the lower edge of the inner glass layer being extended to just above the mounting holes and the addition of inserts in-between the two glass layers in the area just about the holes.

15. Embodiment 15 is the same as embodiment 1 with the addition of at least one coating with thermal and/or anti-reflective enhanced performance (not shown in figures) applied to surface three or surface four of the inner glass layer.

What is claimed is:

1. A vehicle laminated glazing comprising:
an outer glass layer,
   wherein, the outer glass layer is strengthened,
   the outer glass layer is provided with at least one hole configured to receive a mounting means which places the outer glass layer in compression;
an inner glass layer,
   wherein the inner glass layer is strengthened,
   the inner glass layer does not overlap the at least one hole of the outer glass layer,
   the inner glass layer has a lower edge, the lower edge extends at least 20 mm below a beltline, and is overlapped by and captured by the mounting means; and
one or more plastic bonding layers positioned between opposite faces of the inner and outer glass layers,
   wherein the plastic bonding layer serves to bond a surface two of the outer glass layer to a surface three of the inner glass layer.

2. The glazing of claim 1
wherein the one or more plastic bonding layers is provided with at least one cut out area in a portion of the vehicle laminated glazing near a hole, the area is at least partially overlapped by the mounting means; and further comprising:
an insert,
   wherein, a thickness of the insert is substantially identical to a thickness of the plastic bonding layers,
   a size of the insert fits inside of the cutout area in the plastic bonding layer,
   the insert is positioned between the inner and outer glass layers;
   the insert has a stiffness greater than the plastic bonding layer;
   the insert is less compressible than the plastic bonding layer; and
   the insert becomes a permanent part of the vehicle laminated glazing during a lamination process.

3. The glazing of claim 1, wherein an outer edge of the inner glass layer is offset inboard from an edge of outer glass layer along a substantial portion of a glass edge.

4. The glazing of claim 3, wherein the inner glass layer offset is in the range of 0.5 mm to 3.0 mm.

5. The glazing of claim 3, wherein the inner glass layer offset is in the range of 1.0 mm to 2.0 mm.

6. The glazing of claim 1, wherein the inner glass layer is cold bent.

7. The glazing of claim 1, wherein the inner glass layer thickness is between 0.5 mm and 1.6 mm; and the outer glass layer thickness is between 2.5 mm and 6 mm.

8. The glazing of claim 1, wherein the inner glass layer thickness is between 0.5 mm and 1.1 mm; and the outer glass layer thickness is between 3 mm and 5 mm.

9. The glazing of claim 1, wherein the inner glass layer has a chamfered edge finish along at least an exposed portion of an edge.

10. The glazing of claim 1, wherein the inner glass layer has a bullnose edge finish along at least an exposed portion of an edge.

11. The glazing of claim 1, wherein the inner glass layer has a polished edge finish along at least an exposed portion of an edge.

12. The glazing of claim 2, wherein the insert is substantially comprised of at least one of the following materials: glass, carbon fiber composite, steel, aluminum, titanium, plastic, and fiberglass reinforced plastic.

13. The glazing of claim 2, wherein the insert at least partially overlaps the outer glass layer hole.

14. The glazing of claim 2, wherein a portion of the insert extending beyond an edge of the inner glass is thicker than a portion inside of the vehicle laminated glazing.

15. The glazing of claim 2, wherein the insert is extended inboard beyond the overlap of the mounting means towards the beltline.

16. The glazing of claim 2, wherein the plastic bonding layer has an elastic modulus that is higher than 50 MPa.

17. The glazing of claim 1, wherein the outer glass is thermally toughened achieving compressive stress between 60 and 150 MPa, and the inner glass is toughened or strengthened achieving compressive stress between 400 and 900 MPa.

18. The glazing of claim 1, wherein the outer glass is thermally toughened achieving compressive stress between 100 and 140 MPa, and the inner glass is toughened or strengthened achieving compressive stress between 500 and 800 MPa.

19. The glazing of claim 1, wherein a reinforcement is bonded to the surface two of the outer glass layer that is not bonded to the inner glass layer by the plastic bonding layer.

20. The glazing of claim 1, wherein a set of secondary retention holes is provided.

21. The glazing of claim 1, wherein a reinforcement is bonded to the inner and outer glass layers.

22. The glazing of claim 1, wherein the vehicle laminated glazing comprises a plurality of monolithic portions along the lower edge separated by the inner glass layer.

23. The glazing of claim 1, wherein the inner glass layer is coated with at least one coating selected from the group consisting of thermal coating and anti-reflective coating.

* * * * *